A. S. HICKLEY.
ELECTROLYTIC ALTERNATING CURRENT RECTIFIER.
APPLICATION FILED JUNE 26, 1908.
982,494.
Patented Jan. 24, 1911.
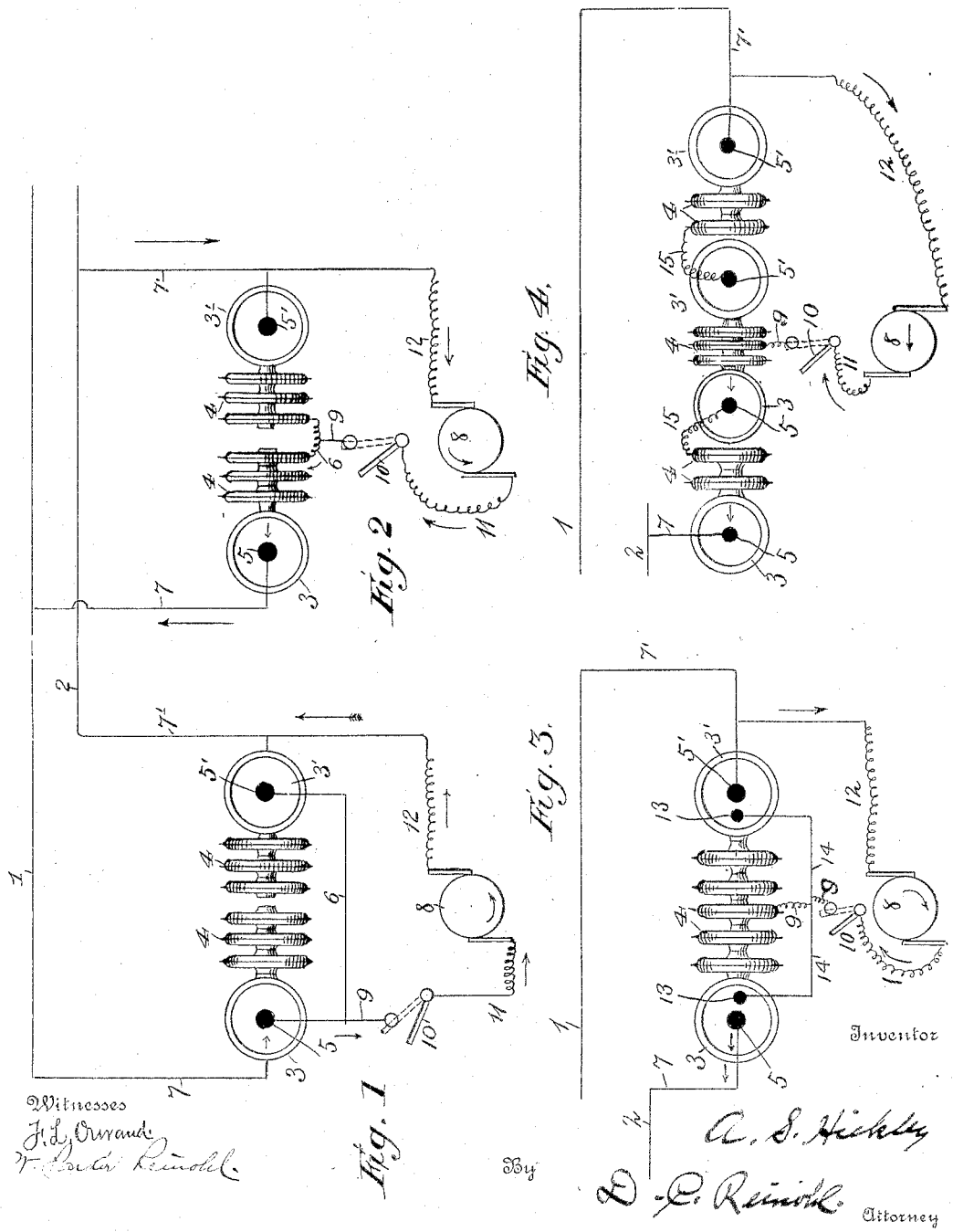

UNITED STATES PATENT OFFICE.

ARTHUR S. HICKLEY, OF MANASQUAN, NEW JERSEY, ASSIGNOR TO COMO ELECTRICAL COMPANY, A CORPORATION OF NEW JERSEY.

ELECTROLYTIC ALTERNATING-CURRENT RECTIFIER.

982,494.

Specification of Letters Patent. Patented Jan. 24, 1911.

Application filed June 26, 1908. Serial No. 440,503.

*To all whom it may concern:*

Be it known that I, ARTHUR S. HICKLEY, a subject of the King of Great Britain, residing at Manasquan, in the county of Monmouth and State of New Jersey, have invented certain new and useful Improvements in Electrolytic Alternating - Current Rectifiers; and I do hereby declare the following to be a full, clear, and exact description of the invention, such as will enable others skilled in the art to which it appertains to make and use the same.

My invention relates to electrolytic alternating current rectifiers, and has for its object the maintenance of formation, that is, the retention of the hydroxid of aluminium upon the active electrode when direct current is not being used. In using electrolytic rectifiers in the ordinary way, there is an appreciable time necessary for the formation of the hydroxid before the cell will rectify, but this when once formed, if a small flow of current is maintained, keeps the cell active and ready for instant work. It often happens that the time consumed in forming the hydroxid is greater than can be allowed and even a small reverse current would be fatal to the successful operation of certain instruments requiring direct current excitation.

In ordinary practice, when alternating current is rectified to direct current by interposing an electrolytic rectifier in the circuit, there are certain difficulties encountered, one of which is, that if the current is interrupted for a time, the hydroxid of aluminium formed upon the aluminium rod or plates on which the rectification depends, is dissolved or passes off, and upon again closing the circuit, alternating current passes for a short time, until the hydroxid is formed and rectification again takes place, and direct current is obtainable. One way to correct this, has been to connect a cell or number of cells of the accumulator type across the direct current terminals, when sufficient current passes to keep these cells charged and at the same time maintain the acting properties in the rectifier. That is however not only expensive when a large number of cells are required, as is the case on high voltage, but the current used to keep the cells charged is considerable. Furthermore, it is detrimental to the cells to continue to pass current through them after they are charged. It is my purpose to overcome both of these difficulties and objections.

The rectifier of my construction is always in an active condition and ready to work the instant it is required to deliver direct current. Such a small amount of current is passed when no direct current is being drawn that it is negligible. To accomplish these ends, I connect two rectifiers, or one rectifier made double, so that one rectifier acts in opposition to the other, that is to say, although the current could pass through the one, it would be impeded by the other. But if any apparatus, such as a motor, battery, arc-light, X-ray apparatus or the like, is connected so as to span one of these cells, the current which is impeded by that cell passes through this apparatus and the other cell does the rectifying.

The invention consists in certain improvements, which will be fully disclosed in the following specification and claims.

In the accompanying drawings, which form part of this specification:—Figure 1 represents a top plan view of my improved rectifier in which two cells are electrically connected in opposition to each other, the non-active electrodes being connected respectively to the alternating current main lines. Fig. 2 a like view in which the active electrodes are connected to the alternating current main lines. Fig. 3 a like view of a modified construction, in which the two cells are connected together electrically and mechanically, the active electrodes in each cell connected respectively to the alternating current main lines. Fig. 4 a like view in which one double cell and two single cells are shown, the two active electrodes of the single cells connected to the alternating current main lines and the non-active electrodes of the single cells connected to the active electrodes of the double cells respectively.

Reference being had to the drawings and the designating characters thereon, the numerals 1, 2 indicate the main-lines respectively of an alternating circuit, 3, 3' indicate the cells for containing a suitable electrolyte, such as phosphate of soda, and said cells form the non-active electrodes. The cells are preferably provided with hollow members 4, through which the electrolyte circulates, and is cooled, as disclosed in Letters-Patent of the United States granted to me July 30, 1907, and numbered 861,282.

Each cell 3 is provided with an active electrode 5, preferably of aluminium or one of its alloys and cell 3' is provided with an electrode 5', and these electrodes are electrically connected together by a wire 6. The cells 3, 3' and the hollow members 4 are made of iron or its equivalent, and each cell is connected to the main lines 1, 2 respectively by wires 7 and 7', as shown in Fig. 1.

8 indicates a motor or other electrical device, connected through wire 9, switch 10, wire 11 and wire 6, with the active electrodes 5 and 5', and wires 12 and 7' connecting with main wire 2.

When the switch 10 is open, as shown, current from the main line 1 has a path through wire 7 to cell 3, to electrode 5, through wire 6, to electrode 5', where it is practically stopped by the formation of hydroxid of aluminium on the electrode 5'. When the reverse impulse from line 2 endeavors to pass through the path 7', cell 3', electrode 5' and wire 6, it is stopped by the hydroxid of aluminium formed on the electrode 5 in the cell 3, thus there is practically no passage of either impulse. On closing switch 10, a path is provided from line 1, through wires 7, cell 3, electrode 5, wire 9, switch 10, wire 11, electrical device 8, wires 12 and 7' to main line 2, thereby operating the electrical device 8.

In the construction shown in Figs. 2, 3, and 4 the main lines 1, and 2 are connected to the two active electrodes, instead of to the non-active electrodes as in Fig. 1. This is preferable for the reason that there is less liability to leakage to the ground, as the two main lines are practically insulated by the formation of hydroxid of aluminium on the two active electrodes to which they are connected.

In Fig. 2 the non-active electrodes or hollow members 4 are connected by wire 6; in Fig. 3 a continuous mechanical connection is made between the two cells 3, 3' by a continuous hollow member 4.

It is obvious that supplemental non-active electrodes 13, such as carbon or graphite, may be inserted in the cells 3, 3' and connected to wire 9, by wire 14 to increase the surface and efficiency of the rectifier.

In Fig. 4, one double, and two single cells are shown; one single cell being connected in series with one of the double cells on the main line 1, and the other single cell is connected in series with the other one of the double cells on the other main line 2, as shown. This arrangement of the cells being especially adapted for current voltage of over one hundred and forty volts; when the two sets of cells connected in series act as two valves, one set on each main line, but are connected together in electrical opposition as in the foregoing figures.

In the several forms shown, the cell which is spanned by the electrical device also acts as a condenser, tending to eliminate any reverse current which may be present and produces a smoother flow of direct current than is ordinarily obtained.

It is obvious that changes may be made in the form and arrangement of the parts without departing from the spirit of my invention.

Having thus fully described my invention, what I claim is—

1. The combination of electrolytic elements connected in opposition and a circuit provided with translating devices bridging elements of like polarity.

2. The combination of electrolytic elements connected in opposition and a circuit provided with translating devices bridging elements of like polarity, and means for making and breaking said circuit.

In testimony whereof I affix my signature, in presence of two witnesses.

ARTHUR S. HICKLEY.

Witnesses:
D. C. REINOHL,
W. PARKER REINOHL.